G. A. FORSGARD.
Improvement in Cultivators.

No. 131,160.  Patented Sep. 10, 1872.

Witnesses
Chas. H. Smith
Geo. D. Walker

Gustave A. Forsgard
Lemuel W. Serrell

G. A. FORSGARD.
Improvement in Cultivators.
No. 131,160. Fig. 2. Patented Sep. 10, 1872.
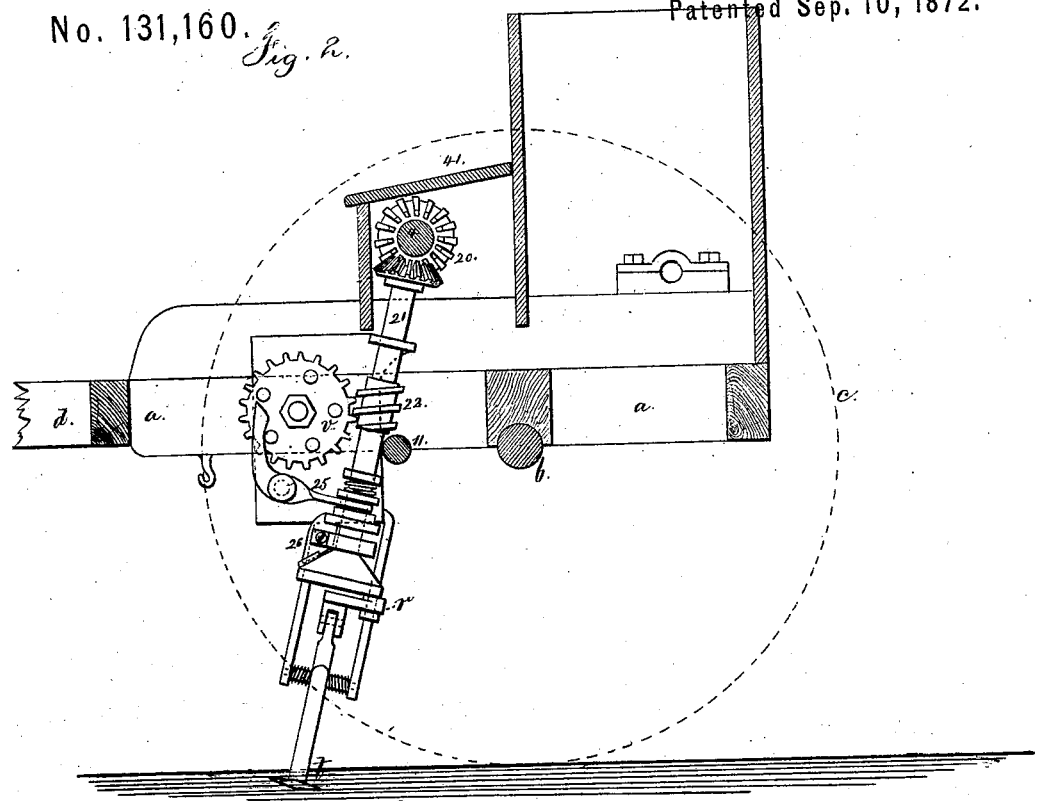
Fig. 5.
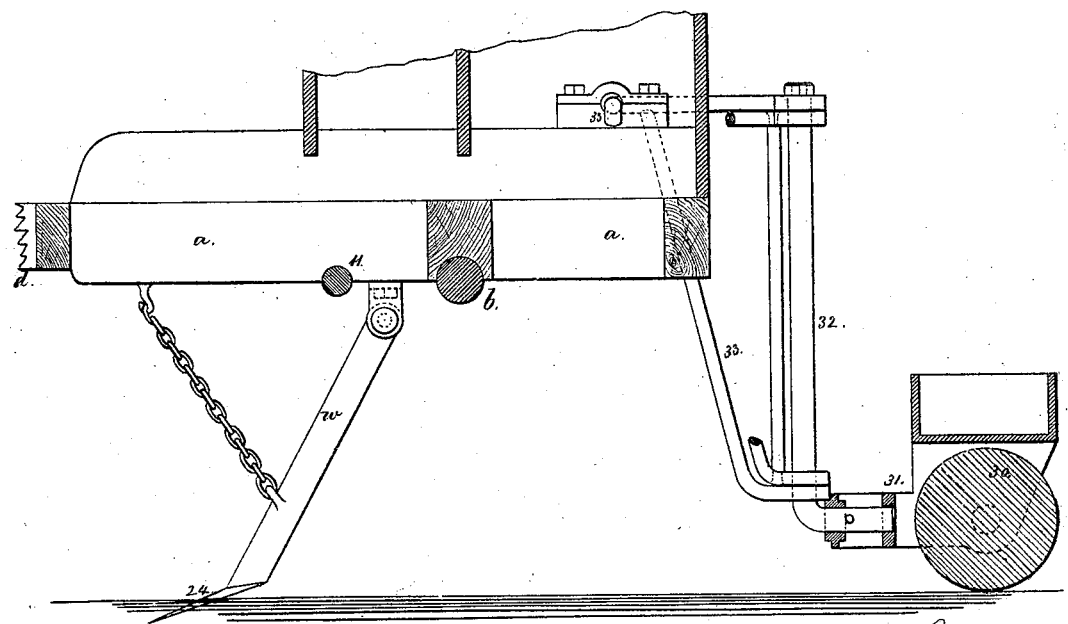
Witnesses: Chas. H. Smith, Geo. D. Walker
Gustave A. Forsgard
Lemuel W. Serrell, Atty.

3 Sheets — Sheet 3.

G. A. FORSGARD.
Improvement in Cultivators.

No. 131,160.  Patented Sep. 10, 1872.

Witnesses
Chas. H. Smith
Geo. D. Walker

Gustave A. Forsgard
Lemuel W. Serrell
att'y

UNITED STATES PATENT OFFICE.

GUSTAVE A. FORSGARD, OF HOUSTON, TEXAS.

IMPROVEMENT IN CULTIVATORS.

Specification forming part of Letters Patent No. 131,160, dated September 10, 1872.

*To all whom it may concern:*

Be it known that I, GUSTAVE A. FORSGARD, of Houston, in the State of Texas, have invented an Improvement in Digging or Cultivating Machines; and the following is declared to be a correct description of the same.

This machine is primarily adapted to the cultivation of cotton; and the improvements herein claimed relate to the parts that form the cultivator. I have, however, shown other parts that may be introduced or removed at pleasure for adapting portions of the machine to other work, thereby lessening the number of machines required for farm or plantation work. My machine is mounted upon wheels and drawn by one or more horses or animals, the shafts being made with the frame so as to guide the machine with precision. There are spikes projecting through the rims of the wheels, connected to an eccentric ring, so as to give greater adhesion to the wheels, and the eccentric for the ring is movable so that the spikes can be drawn in at the bottoms of the wheels in going to or leaving the field, or when not required. The cultivating or digging is performed by a series of revolving spades, hoes, or knives, upon a shaft that is driven by a connection to the pinion that gears into the main wheel or wheels. This reciprocating hoe or knife can be set so as to accommodate plants at any distance apart.

Figure 3:
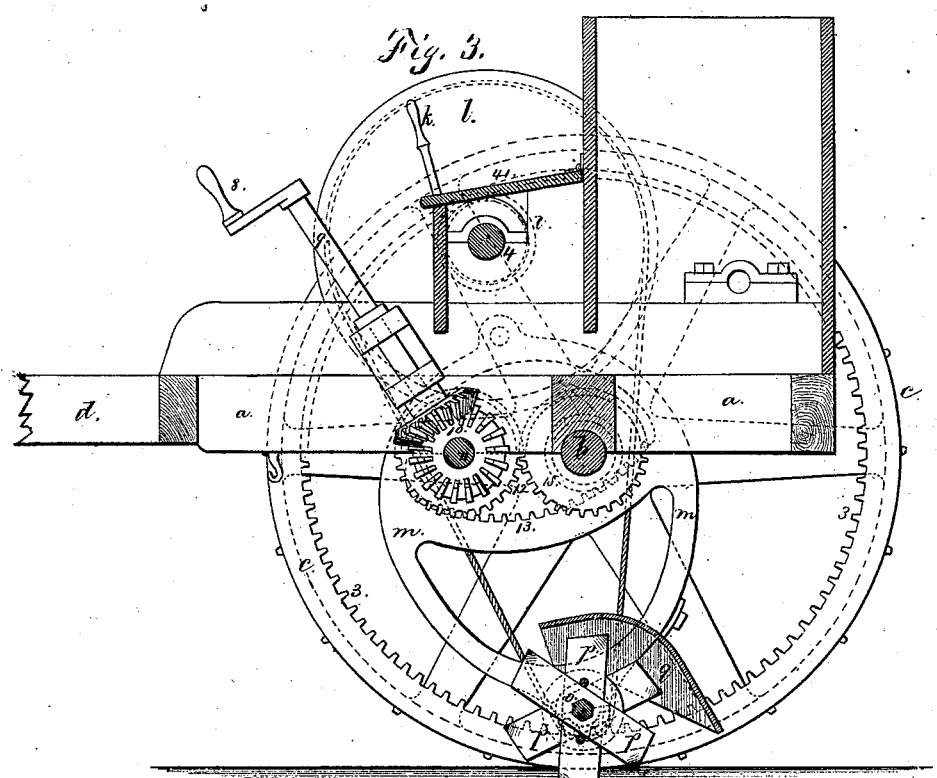
Figure 1:
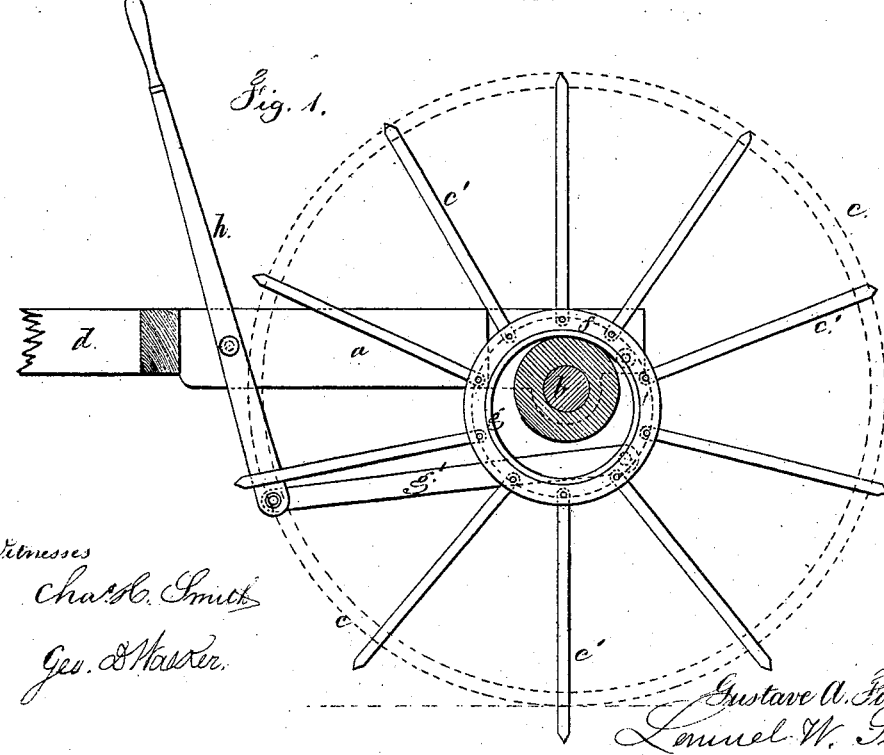
Figure 4:
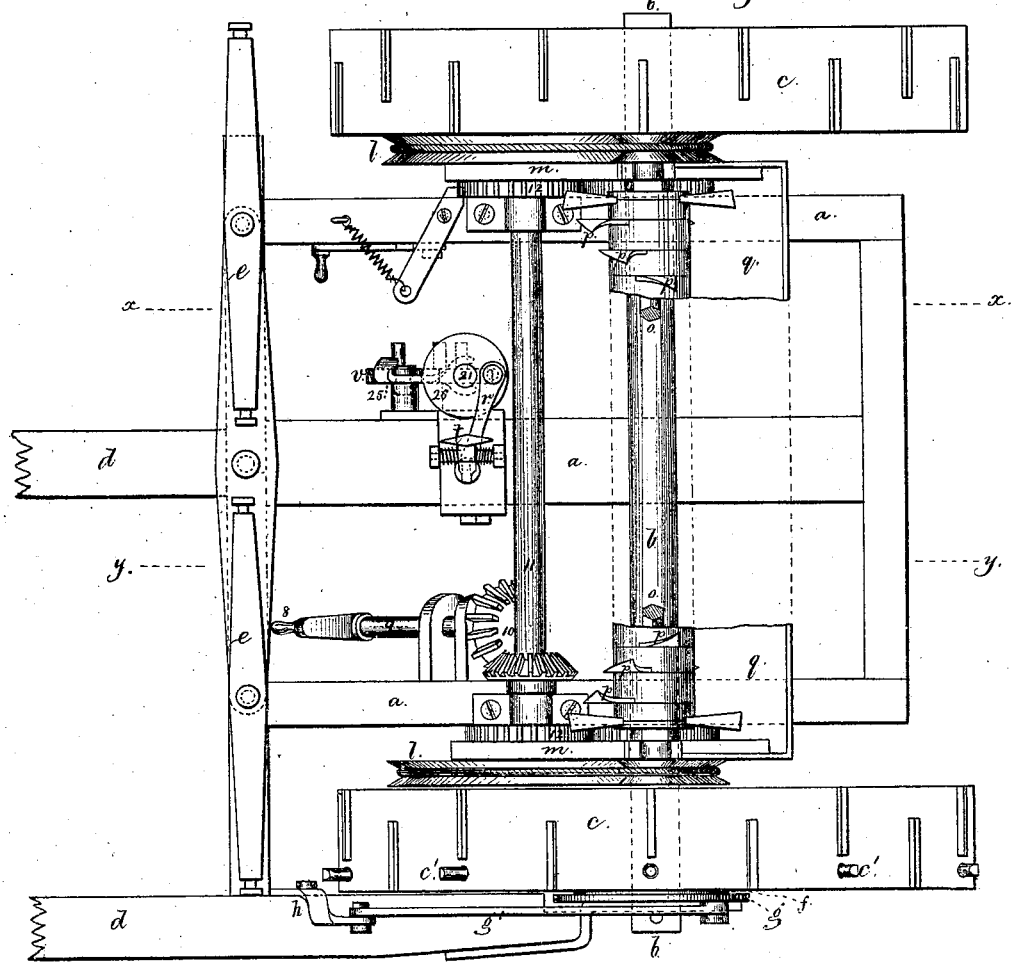

In the drawing, Figure 1 is a side view, showing the wheel. Fig. 2 is a vertical section at the line $x\,x$, showing the reciprocating stirrer. Fig. 3 is a section at the line $y\,y$, and Fig. 4 is an inverted plan of the machine.

Figure 6:
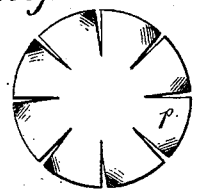
Figure 9:
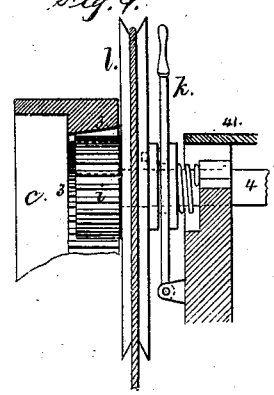
Figure 7:
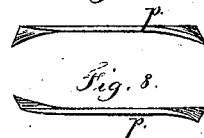
Figure 8:
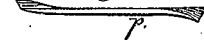

The frame $a$ is mounted upon the axle $b$ and wheels $c$, and is made with the shafts $d$ and whiffletrees $e$ for attaching two horses, one of which, being between the shafts $d$, guides and steadies the machine more effectually than it would be if only a tongue or pole were made use of. One or both of the wheels $c\,c$ are provided with rods or spikes $c'$, attached at their inner ends to the ring $f$, that is supported by the eccentric $g$ near or upon the hub or axle of the wheel; and a connecting-rod, $g'$, and lever $h$ are employed to move and hold the eccentric so as to project the spikes at the bottom of the wheel when in use, or to withdraw them when not required for use, as upon going to or returning from the field. The gear-wheels 3, upon the wheels $c$, are made as shown in Fig. 9, so that the bottom of the grooves between the teeth will stand at an inclination and allow the earth or foreign substances entering between the teeth to be forced down such inclines and be delivered at the ends of the teeth, thereby making the gear-wheels self-clearing. The pinion $i$ gears into the wheel 3, and upon the shaft 4 of said pinion there are band-wheels, $l$, attached firmly, and upon the shaft 4 are sliding spring-couplings with projecting pins, forming clutches to the said pinions, and the teeth upon these pinions receiving the clutch-pins are inclined so that when the machine is being turned or backed the clutch-pins will yield and allow the wheel 3 and pinion $i$ to revolve backward without turning the other parts. These clutches can be withdrawn by the levers $k$, so as to throw the operative parts out of action when not required. These parts are shown detached in Fig. 9. The frames $m$ are hung to swing upon the shaft 4, or upon bolts, screws, or pivots, upon the frame $a$, and these frames $m$ carry the shaft $o$ of the rotary spades or knives $p$, and also the hood or shield $q$. The shaft $o$ is revolved by gearing, chain, or belts from the wheel $l$; and the frame $m$ can be either raised or lowered to elevate the knives $p$, or make them cut deeper; and to effect this the handle 8, shaft 9, gears 10, shaft 11, and gears 12 and 15 are made use of to act upon the racks 13 of the frames $m$. The hoes, spades, or knives $p$ are made with cutting-edges and inclined shares at the ends, as illustrated in the detached views Figs. 6, 7, and 8. Some of these knives have the ends turned in the same direction, and in others one end is turned one way and the other the opposite way. These cutters are removable, and sustained upon the shaft by rings or segments intervening, and by end nuts or collars. By arranging these knives upon their shaft the curved share-shaped ends will throw the earth toward the center or toward any required point for forming a ridge, as in cultivating potatoes, corn, &c., and where a line of plants requires banking, the knives in the center, or those coming in the line of the plants, will be left out. By reversing the position of the knives the earth can be thrown from the center so as to leave a ditch or furrow, and, in this case, the central knives may be the longest. By alternating the positions of the share-shaped ends the earth will be simply mixed and pulverized. The hood or shield $q$ prevents the earth being scattered or thrown over by the centrifugal action. Upon the shaft 4 is a bevel-gear, 20, giving motion to the shaft 21, and this has a worm, 22, to revolve the wheel $v$. Changeable pins on this wheel $v$ either operate a slide or seed dropper so as to plant through the tube $w$ and furrow-plow 24, (see Fig. 5;) or else this wheel $v$ and pins are employed to operate a clutch-lever, 25, and clutch 26, and periodically arrest the movement of the crank $r$ and reciprocating stirrer $t$. It is to be understood that the reciprocating stirrer is operated by the shaft 21 and crank when coupled together, but that the movement will be arrested during the time that the lever 25 is pressed back by one of the pins and the couplings disconnected. This reciprocating stirrer is employed between the plants in a row to remove weeds and surplus plants, or to cultivate between plants as aforesaid. This portion of the apparatus may be removed when the furrow-plow and seeder is employed. The roller 30 is in a frame, 31, that is drawn by the vertical bolt 32 and slings 33 to the frame $a$, and by this construction the roller is free to accommodate itself to the surface passed over, and also to turn like a caster-wheel in passing around the headland. Additional weight may be placed in the box or frame over the roller when required.

The seat for the driver may be made of the box or hopper 41, employed for holding seeds, manure, or fertilizers; and any desired mechanism may be added to the devices before described so as to drop such seeds or scatter the fertilizers.

The wheels and gearing shown may be used with a series of spades, acting perpendicularly or at an inclination, in place of the revolving spades or cutters represented in the drawing.

Steam or other power may be employed with this machine and the mechanism be supported by the frame $a$ or a separate frame. A steering wheel or wheels in such case will be required, and the power will act upon the wheels $c$ to propel the machine as well as upon the digging mechanism.

I claim as my invention—

1. The rods or spikes $c'$, attached at their inner ends to the ring $f$ and passing through the rim of the wheel $c$, in combination with the eccentric $g$, rod $g'$, and lever $h$, for projecting such spikes when the cultivator is in use, or withdrawing them at the side in contact with the earth when going to or returning from the field, as set forth.

2. The revolving cultivator, made of a series of changeable and reversible spades or knives with share-shaped ends, retained in position between rings, and removable, substantially as specified, so that the arrangement of the spades may be varied, as specified.

3. The frames $m$, connected at their upper ends to the frame $a$ and carrying at their lower ends the shaft $o$ of the revolving spades or knives, in combination with the gearing, 10, 12, and 15, and operating mechanism for moving said frames $m$ and raising or depressing the said knives, substantially as set forth.

4. The intermittent reciprocating stirrer $t$, constructed and operated substantially as and for the purposes set forth.

Signed this 9th day of November, A. D. 1871.

GUSTAVE A. FORSGARD.

Witnesses:
CHAS. H. SMITH,
GEO. T. PINCKNEY.